United States Patent
Pandharipande et al.

(10) Patent No.: US 9,445,435 B2
(45) Date of Patent: Sep. 13, 2016

(54) METHOD FOR TRANSMITTING DATA IN A WIRELESS NETWORK, AND WIRELESS NETWORK THEREFOR

(75) Inventors: Ashish Vijay Pandharipande, Eindhoven (NL); Thomas Falck, Eindhoven (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 113 days.

(21) Appl. No.: 13/389,308

(22) PCT Filed: Jul. 27, 2010

(86) PCT No.: PCT/IB2010/053397
§ 371 (c)(1),
(2), (4) Date: Feb. 7, 2012

(87) PCT Pub. No.: WO2011/021121
PCT Pub. Date: Feb. 24, 2011

(65) Prior Publication Data
US 2012/0134292 A1 May 31, 2012

(30) Foreign Application Priority Data
Aug. 17, 2009 (EP) .................... 09305760

(51) Int. Cl.
*G01R 31/08* (2006.01)
*H04J 1/16* (2006.01)
(Continued)

(52) U.S. Cl.
CPC ......... *H04W 74/0816* (2013.01); *H04W 16/14* (2013.01); *H04W 84/18* (2013.01)

(58) Field of Classification Search
CPC .................................................. H04W 84/18

USPC ........................................................ 370/252
See application file for complete search history.

(56) References Cited

U.S. PATENT DOCUMENTS 7,016,812 B2 * 3/2006 Aritsuka et al. ............... 702/188
8,107,966 B2 * 1/2012 Choi et al. .................... 455/450
(Continued)

FOREIGN PATENT DOCUMENTS

JP  2008054237 A  3/2008
JP  2008099075 A  4/2008
(Continued)

OTHER PUBLICATIONS

IEEE, 21-245 of Sep. 2008, Dynamic spectrum allocation in wireless cognitive sensor network: Improving Fairness and Energy efficiency, pp. 1-5, Sang-scon Byun, Ilangko Balasingham.*
(Continued)

*Primary Examiner* — Maharishi Khirodhar
(74) *Attorney, Agent, or Firm* — Meenakshy Chakravorty

(57) ABSTRACT

Method for transmitting data from a resource-constrained transmitter to a receiver in a wireless network, comprising the following steps:—the resource-constrained transmitter (21a, 21b, 21c) sending a channel request message to the receiver,—in response to the request, the receiver (22) determining communication channel availability based on the result of a sensing step and broadcasting channel information,—the resource-constrained transmitter (21a, 21b, 21c) listening to the information and transmitting data on the corresponding channel, wherein the sensing step is performed by the receiver before or after receiving channel request from the transmitter. The invention also relates to a wireless network.

12 Claims, 1 Drawing Sheet

(51) Int. Cl.
*H04J 3/14* (2006.01)
*H04J 1/02* (2006.01)
*H04W 74/08* (2009.01)
*H04W 16/14* (2009.01)
*H04W 84/18* (2009.01)

(56) References Cited

U.S. PATENT DOCUMENTS

| | | | |
|---|---|---|---|
| 8,139,623 B2* | 3/2012 | Nielsen et al. | 375/219 |
| 2005/0021296 A1* | 1/2005 | Aritsuka et al. | 702/183 |
| 2007/0014268 A1* | 1/2007 | Kim et al. | 370/338 |
| 2008/0194925 A1 | 8/2008 | Alsafadi | |
| 2009/0040971 A1* | 2/2009 | Alicot et al. | 370/329 |

FOREIGN PATENT DOCUMENTS

| | | |
|---|---|---|
| JP | 2009152880 A | 7/2009 |
| WO | WO 2005011183 A2 * | 2/2005 |

OTHER PUBLICATIONS

Sangscon Byun et al., "Dynamic Spectrum Allocation in Wireless Cognitive Sensor Networks: Improving Fairness and Energy Efficiency", Vehicular Technology Conference, 2008. VTC 2008-Fall. IEEE 68th, IEEE, Piscataway, NJ, USA, Sep. 21, 2008, pp. 15.

O. B. Akan et al., "Cognitive Radio Sensor Networks", IEEE Network, IEEE Service Center, New York, NY, US, vol. 23, No. 4, Jul. 1, 2009, pp. 34-40.

M. Kuroda et al., "A Study of Radio-Information Services for Networks of Cognitive Radios", Networking Technologies for Software Define Radio Networks, 2007 2nd IEEE Workshop, Jun. 18-21, 2007, San Diego, CA.

M. Chuah et al., "Node Density-Based Adaptive Routing Scheme for Disruption Tolerant Networks", Department of Computer Science & Engineering, Lehigh University, Military Communications Conference, MILCOM 2006, IEEE, Oct. 23-25, 2006, Washington, DC.

\* cited by examiner

METHOD FOR TRANSMITTING DATA IN A WIRELESS NETWORK, AND WIRELESS NETWORK THEREFOR

FIELD OF THE INVENTION

The present invention relates to a method for transmitting data in a wireless network. More precisely, the present invention relates to a method for establishing a communication link between a resource-constrained transmitter and a receiver in such a network.

This invention is, for example, relevant for body sensor networks or personal area networks.

BACKGROUND OF THE INVENTION

Wireless sensor networks are being increasingly used to realize applications in domains like healthcare monitoring, building automation and lighting, or wireless connectivity and controls. This, in parallel with the explosive growth of wireless applications and services, has led to a scarcity of available licensed spectrum for allocation. To deal with the need to improve utilization of radio spectrum, more flexible spectrum sharing models like secondary spectrum sharing are being considered. As a consequence, an increasing portion of next-generation wireless networks will likely operate on secondary basis on licensed spectrum. Such operation refers to the situation where a secondary system is allowed to operate on the same radio spectrum that has been allocated to a licensed system (also referred to as a primary system). The secondary system is constrained to operate under the condition that its transmission does not result in harmful interference to the primary system beyond a certain specified limit. This requirement can be met by spectrum sensing, which involves the determination that a channel is vacant before it can be used by the secondary system.

Devices included in Personal area networks, or in body sensor networks, that operate on secondary basis on licensed spectrum require operating protocols carrying out sensing features.

Body sensor networks comprise many sensor nodes, used for measuring physiological parameters and for transmitting them to a sensor hub or gateway. The topology of such networks is generally asymmetric, since sensor nodes are required to be energy-efficient, while the sensor hub, or gateway, can be more complex with greater hardware and software capabilities. Moreover, in these networks, the data flow is largely from the sensor nodes to the hub or gateway.

Several sensing protocols have been proposed, wherein, if a communication link is to be established between a pair of transmitter-receiver on a secondary basis, the transmitter first performs sensing to determine whether or not a licensed system signal is active on the channel. If the channel is found vacant, the transmitter can begin communication with the receiver. These protocols, wherein the receiver has no role in sensing, may be termed transmitter-centric. It has been noticed that, if such protocols are highly efficient in some wireless networks, they appear as being problematic when it comes to body sensor networks.

Indeed, in body sensor networks, sensor nodes, which are required to transmit information to a sensor hub, or gateway, must have a long life-time as compared to their resource capacity, since these nodes are generally intended to be placed on a human body, and thus can not carry out large batteries, and can not be wirely powered either. Accordingly, having each sensor node perform periodic sensing, as required in a transmitter-centric network, is highly energy-consuming for sensor nodes, and require frequent replacement or load of these nodes, which is almost incompatible with correct operation of body sensor networks.

Moreover, in the context of solutions for achieving secondary spectrum access in the 2.36-2.4 GHz band which is being proposed for medical body area networks, it can be noted that radios based on the IEEE 802.15.4 Physical/MAC layer may be reused with suitable protocol modifications. In the current standard specification, a sporadic channel assessment is adopted instead of continuously sensing the medium. Once an empty channel is found, the network is setup on that channel. Different radios contend for that channel through carrier sense multiple access protocols or variations of it. Such a mechanism is suitable for coexistence in unlicensed spectrum. However it is problematic if used for secondary spectrum access, due to regulatory constraints on interference avoidance to licensed systems. It is an object of the invention to use the proposed protocol as a MAC modification such that in combination with the 802.15.4 PHY, the radios may be used to meet regulatory constraints of secondary spectrum use.

SUMMARY OF THE INVENTION

It is an object of the invention to propose a method for establishing a communication link between a resource-constrained transmitter and a receiver that overcomes the above-mentioned major drawbacks.

It is another object of the invention to propose a method suitable for use with low-power body sensor nodes.

Yet another object of the invention is to propose a method that can be used as a MAC modification such that, in combination with the 802.15.4 PHY, the radios may be used to meet regulatory constraints of secondary spectrum use.

Another aspect of the invention relates to a wireless network comprising at least one resource-constrained transmitter and one receiver able to carry out a method according to the invention.

Thus, the invention proposes a receiver-centric protocol, wherein a network can be correctly operated without requiring any role of a resource-constrained transmitter in the sensing and determination of channel availability for communication.

Accordingly, the invention proposes a method for transmitting data from a resource-constrained transmitter to a receiver in a wireless network, comprising the following steps:

the resource-constrained transmitter sending a channel request message to the receiver, in response to the request, the receiver determining communication channel availability based on the result of a sensing step and broadcasting channel information, the resource-constrained transmitter listening to the information and transmitting data on the corresponding channel, wherein the sensing step is performed by the receiver before or after receiving channel request from the transmitter.

The wireless network is, for example, a health monitoring network, and the resource-constrained transmitter is a body sensor node whose task is to monitor patient vital signs and transmit this data to a receiver, which is a sensor hub or gateway.

Body sensor nodes are characterized in that they offer restricted resources, in terms of power, and memory. This invention is not limited to the case where the network comprises only one node, but is suitable for any number of nodes.

Several embodiments are proposed for a method according to the invention. These embodiments will be described later with more details in connection with drawings.

In a first embodiment, the step of sensing the network is performed periodically by the receiver during predetermined sensing slots.

In this embodiment, in a particular configuration, the step of sending a channel request is performed before expiration of a short delay after a sensing slot. In yet another particular configuration, the method comprises the step for the receiver, of going into a power saving mode until next sensing slot in case no channel request is received at expiration of the short delay. These two features make it possible to reduce the amount of energy spent by the receiver, in providing specific slots wherein the receiver is supposed to be receiving channel requests from a transmitter. Apart from these slots, the receiver is not supposed to receive any message, and then can stop listening to the communication channels, thus saving energy.

In a second embodiment of the invention, the step of sensing the network is performed upon receiving a channel request from the resource-constrained transmitter. This embodiment has the advantage of reducing energy spending, because the sensing action is performed only when necessary. However, the first embodiment is highly advantageous in case where the transmitter regularly transmits data, because it allows saving time, since the sensing step is already performed when data has to be transmitted.

To further save energy in this second embodiment, in a particular configuration the step of sending a channel request is performed during one of regular pre-allocated time slots known by the receiver, which means that the receiver only has to listen during particular slots, and can enter into a power saving mode after a pre-allocated time slot, in case no request is received, until the next pre-allocated time slot.

In all embodiments, the determination of channel availability by the receiver is performed by taking into account transmission characteristics of the resource-constrained transmitter, and of other devices in the network.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
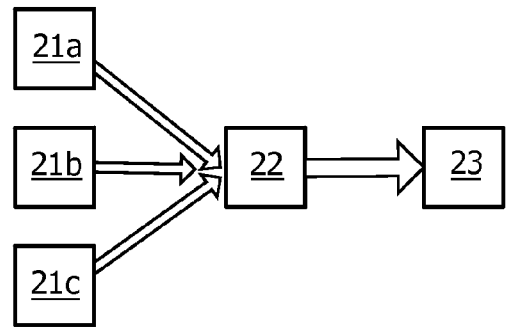
FIG. 1 shows a wireless network wherein a method according to the invention is carried out.

The present invention relates to a method for transmitting data from a resource-constrained transmitter to a receiver, in a wireless network. In the present description we consider a wireless sensor network topology typical in patient monitoring applications, depicted in FIG. 1. A number of body sensor nodes (21a, 21b, 21c) monitor patient vital signs and communicate measured information over a short-range wireless link to a sensor hub/gateway 22. The sensor hub 22 then transmits the gathered results to a processing unit 23.

The body sensor nodes, corresponding to the above-mentioned resource-constrained transmitters, have restricted capabilities in terms of power and memory. Indeed, such sensors are generally small devices, intended for being wirelessly placed on a human body, and thus they have to be power-independent, and to have a small size.

In existing networks, communication between the sensor nodes and the sensor hub is performed by using a protocol compliant with IEEE 802.15.4. However, it is an object of the present invention to propose sensing protocols to be performed on a secondary spectrum basis, e.g. in the 2.36-2.4 GHz.

Communication between the sensor hub 22 and the remote processing unit 23 is performed via a wireless link, for example via a telemetry link or a WLAN.

We will now describe two specific embodiments of a method according to the invention. These embodiments will be described with reference to the time diagrams of FIGS. 2 and 3.

Figure 2:
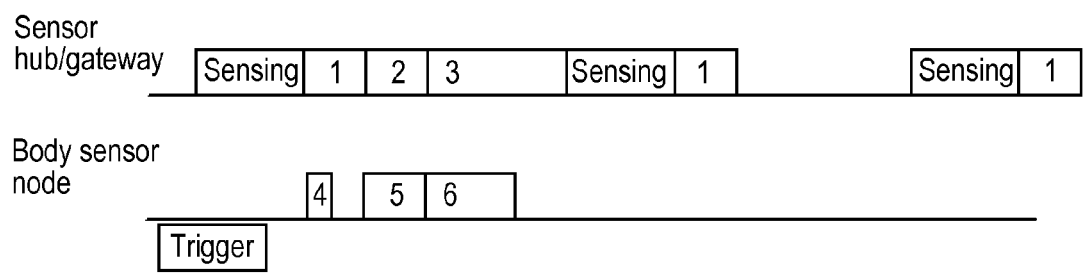
FIG. 2 is a timing diagram of a first embodiment of a method according to the invention.
Figure 3:
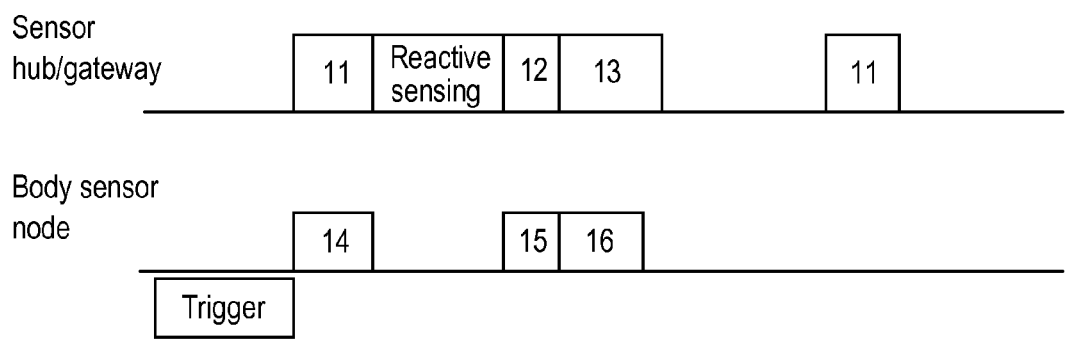
FIG. 3 is a timing diagram of a second embodiment of a method according to the invention.

In a first embodiment, shown in FIG. 2, the sensor hub regularly performs sensing of the vicinity, during predetermined "sensing" slots, in order to determine channels that might be available for communication between body sensor nodes of the network, and the receiver. The body sensor nodes have the task of monitoring patient vital signs and of transmitting this data on a regular basis, or when some abnormality in patient condition is noted, requiring immediate alert. Then, when there is a need for transmitting data to the sensor hub (event "Trigger"), a Channel Request (Ch_Req) beacon is transmitted to the sensor hub. This transmission may be done in time division multiple access, in slot 4 that is preallocated to the sensor node.

The body sensor node is aware of when the sensing slots are scheduled, and then sends the Ch_Req only immediately after a sensing slot. On the sensor hub side, the sensing slot is followed by a time slot 1, wherein possible Ch_Req beacons are received by body sensor nodes. If a Ch_Req is actually received by the Sensor hub during slot 1, then the available channel information allocations to requesting sensor nodes, possibly including time resource for transmission, are broadcast in the form of a Ch_Alloc beacon, during slot 2. The determination of channel availability by the sensor hub may take into account the transmission characteristics of the primary systems, i.e. the licensed devices operating in the same vicinity, as well as other unlicensed devices, such as body sensor nodes.

The Ch_Alloc beacon is listened to by the sensor nodes during slot 5. Upon receiving this information, the sensor node transmits its data using the allocated resource block 6, corresponding to a listening slot 3 for the sensor hub.

In case no Ch_Req is received during slot 1, then the sensor hub may goes into a silent power saving mode till the next sensing slot.

In an advantageous embodiment, the sensing slots are scheduled with a periodicity such that the QoS latency requirement of the body sensor nodes transmission is satisfied. Sensing with such a periodicity also means that the sensor hub performs sensing even if there is no Ch_Req. This can lead to unnecessary energy consumption at the sensor hub in case when sensor nodes are seldom triggered.

In order to provide a method suitable for this particular case, a second embodiment of a method according to the invention is proposed. This second embodiment will be described in connection with the time diagram shown on FIG. 3.

In this second embodiment, the sensor hub does not perform regularly sensing. Then, when a body sensor node needs to transmit data (event "Trigger" in the diagram), a Channel Request (Ch_Req) is transmitted from the body sensor node to the sensor hub. This transmission is performed in slot 14, which is preallocated to the sensor node. This preallocated slot 14 corresponds to a slot 11 during which the sensor hub is into receiving mode. The receiver, i.e. the sensor hub, reacts to a Ch_Req by performing sensing ("Reactive sensing") to determine channel availability. As in the first embodiment, the determination of channel availability may take into account the transmission characteristics of the primary systems as well as other body sensor networks in the vicinity. After having performed the sensing step, the sensor hub broadcasts a Ch_Alloc beacon comprising the available channel information allocations to requesting sensor nodes. This broadcasting is done during slot 12, immediately following the "Reactive sensing" slot. The sensor node listens to the Ch_Alloc beacon over slot 15. Upon receipt of the beacon, the sensor node transmits its data by means of the allocated resource block 16.

In case no Ch_Req is received by the sensor hub during slot 11, then the sensor hub goes into a silent power saving mode till next slot 11, where it has to listen to possible Ch_Req beacons that would be sent by a body sensor node. In a particular embodiment, slots 11, where possible Ch_Req may be received from a body sensor node, are scheduled with a periodicity such that the QoS latency requirement of the body sensor node transmissions is satisfied.

The second embodiment herein described has the advantage that the sensor hub does not need to perform sensing periodically as required in sensing protocol, but performing sensing only when required, thus saving resources. However, the protocol of the first embodiment is highly advantageous in configuration wherein sensor nodes regularly transmit data.

Both embodiments present the common advantage, as compared with prior art methods, that the sensing action is performed by the sensor hub, and not by the sensor nodes. This makes it possible to save resources of the sensor nodes, which do not have to waste power for this action.

The present invention is more especially dedicated to health monitoring device, but is suitable for a variety of wireless sensor networks including body sensor networks and personal area networks. In particular, the proposed sensing protocols may be applied to achieve wireless connectivity on secondary basis for body sensor networks, using for example 802.15.4 radios, to operate in new medical bands such as 2.36-2.4 GHz and will find application in next-generation wireless patient monitoring systems.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting. From reading the present disclosure, other modifications will be apparent to persons skilled in the art. Such modifications may involve other features which are already known in the art of radio communication and the art of wireless networks and which may be used instead of or in addition to features already described herein.

The invention claimed is:

1. A method for transmitting data from a resource-constrained transmitter to a receiver in a wireless network, comprising:

sending a channel request message to the receiver, the channel request message requesting the receiver to determine an available communication channel, listening for the channel request message by the receiver during periodic predetermined slots, in response to the channel request message, the receiver determining communication channel availability based on sensing the wireless network during a sensing slot and then broadcasting channel information associated with at least one channel, the transmitter listening to the channel information and then transmitting data on the at least one channel, and the receiver going into a power saving mode when the channel request message is not received during one of the periodic predetermined slots.

2. The method according to claim 1, wherein the resource-constrained transmitter is a low-power sensor node.

3. The method according to claim 1, wherein sensing the wireless network is performed periodically by the receiver during predetermined sensing slots.

4. The method according to claim 3, wherein sending the channel request message is performed before expiration of a delay after a sensing slot.

5. The method according to claim 4, wherein the receiver goes into the power saving mode until a next sensing slot when the channel request message is not received at expiration of the delay.

6. The method according to claim 1, wherein sensing the wireless network is performed upon receiving the channel request message from the resource-constrained transmitter.

7. The method according to claim 6, wherein sending the channel request message is performed during a one of pre-allocated time slots known by the receiver.

8. The method according to claim 7, wherein the receiver goes into the power saving mode after the pre-allocated time slot when the channel request message is not received, until a next pre-allocated time slot.

9. The method according to claim 1, wherein determining the communication channel availability is performed by taking into account transmission characteristics of the resource-constrained transmitter and of other devices in the wireless network.

10. A wireless network, comprising:

a resource-constrained transmitter for transmitting data to a receiver, and for sending a channel request message to the receiver when the data is transmitted, the channel request message requesting the receiver to determine an available communication channel, and a receiver for listening for the channel request message during periodic predetermined slots, determining channel availability by sensing the wireless network during a sensing slot and for transmitting channel information associated with at least one channel to the resource-constrained transmitter upon receipt of the channel request message, wherein the receiver is further configured to go into a power saving mode when the channel request message is not received during one of the periodic predetermined slots.

11. A resource-constrained device for transmitting data in a wireless network, comprising:

a memory; and a transmitter configured to:

send a channel request message to a receiver when the device has to transmit data to the receiver, the channel request message requesting the receiver to determine an available communication channel, wherein the receiver is configured to listen for the channel request message during periodic predetermined slots, determine channel availability by sensing the wireless network during a sensing slot and go into a power saving mode when the channel request message is not received during one of the periodic predetermined slots;

receive an allocated communication channel information from the receiver; and transmit the data using the allocated communication channel.

12. A method for transmitting data by a resource-constrained device in a wireless network, comprising:

sending a channel request message to a receiver when the device has to transmit data to the receiver, the channel request message requesting the receiver to determine an available communication channel, wherein the receiver is configured to listen for the channel request message during periodic predetermined slots, determine channel availability by sensing the wireless network during a sensing slot and go into a power saving mode when the channel request message is not received during one of the periodic predetermined slots;

receiving an allocated communication channel information from the receiver; and transmitting the data using the allocated communication channel.

* * * * *